US011382322B2

(12) United States Patent
Chapel et al.

(10) Patent No.: US 11,382,322 B2
(45) Date of Patent: Jul. 12, 2022

(54) PLANER BOARD

(71) Applicant: KCSR LLC, Grand Haven, MI (US)

(72) Inventors: Karl Chapel, Grand Haven, MI (US); Robert Chapel, Grand Haven, MI (US); Shane Ruboyianes, Scottville, MI (US); Michiel Vandeven, West Olive, MI (US)

(73) Assignee: KCSR LLC, Grand Haven, MI (US)

( * ) Notice: Subject to any disclaimer, the term of this patent is extended or adjusted under 35 U.S.C. 154(b) by 317 days.

(21) Appl. No.: 16/718,373

(22) Filed: Dec. 18, 2019

(65) Prior Publication Data

US 2020/0187479 A1 Jun. 18, 2020

Related U.S. Application Data

(60) Provisional application No. 62/781,005, filed on Dec. 18, 2018.

(51) Int. Cl.
*A01K 97/12* (2006.01)
*A01K 91/08* (2006.01)

(52) U.S. Cl.
CPC .............. *A01K 97/12* (2013.01); *A01K 91/08* (2013.01)

(58) Field of Classification Search
CPC ........ A01K 97/12; A01K 91/06; A01K 93/00; A01K 91/00; A01K 91/02; A01K 91/03; A01K 91/04; A01K 91/047; A01K 91/053
See application file for complete search history.

(56) References Cited

U.S. PATENT DOCUMENTS

| | | | | |
|---|---|---|---|---|
| 2,816,385 | A | * 12/1957 | Luketa | A01K 73/045 43/9.7 |
| 2,883,787 | A | * 4/1959 | Dahl | A01K 85/16 43/43.13 |
| 2,901,857 | A | 9/1959 | Lockert | |
| 3,067,539 | A | 12/1962 | Black | |
| 3,507,068 | A | * 4/1970 | Roberts | A01K 91/08 43/17 |
| 3,818,624 | A | 6/1974 | Duffy | |
| 3,902,268 | A | 9/1975 | Talbot | |
| 3,949,512 | A | * 4/1976 | Stegemeyer | A01K 91/08 43/43.13 |
| 4,015,362 | A | * 4/1977 | Johnson | A01K 91/06 43/43.11 |
| 4,138,793 | A | 2/1979 | Kellie | |
| 4,524,538 | A | * 6/1985 | Halvorsen | A01K 91/08 43/43.13 |

(Continued)

*Primary Examiner* — Timothy D Collins
*Assistant Examiner* — Nicholas Leo Seneczko
(74) *Attorney, Agent, or Firm* — Bochner IP, PLLC; Andrew D. Bochner (57) ABSTRACT

Various planer boards are provided that include a body having a tapered leading end, a guiding assembly located at a trailing end of the body, and a gripping assembly extending away from a front surface of the body. The planer boards may be securely attached to a fishing line via the guiding assembly and the gripping assembly in order to bias the line to one side when the planer board is moved through water. To allow a user quickly and easily attach/remove a fishing line, the planer board may include a single-release actuator that opens only the gripping assembly and a dual-release actuator that simultaneously releases both the guiding assembly and the gripping assembly.

16 Claims, 8 Drawing Sheets

(56) References Cited

U.S. PATENT DOCUMENTS

| | | | |
|---|---|---|---|
| 4,745,702 A * | 5/1988 | Koch | A01K 91/08 43/43.13 |
| 4,856,222 A | 8/1989 | Hannam | |
| 5,341,591 A | 8/1994 | Hicks | |
| 5,548,919 A * | 8/1996 | Hicks | A01K 91/08 43/43.13 |
| 5,867,933 A | 2/1999 | Walker | |
| 5,875,583 A | 3/1999 | Church | |
| 5,921,015 A | 7/1999 | Newell et al. | |
| 6,119,389 A * | 9/2000 | Walker | A01K 97/125 43/17 |
| 6,243,983 B1 * | 6/2001 | Walker | A01K 91/08 43/43.12 |
| 6,256,924 B1 * | 7/2001 | Walker | A01K 91/08 43/43.13 |
| 6,412,215 B1 * | 7/2002 | Even | A01K 91/08 43/43.13 |
| 6,789,350 B1 | 9/2004 | Link | |
| 7,143,541 B2 * | 12/2006 | Buero | A01K 91/08 43/43.12 |
| 7,337,578 B2 | 3/2008 | Pieczynski | |
| 7,343,708 B2 * | 3/2008 | Pieczynski | A01K 97/01 43/17 |
| 7,380,366 B1 * | 6/2008 | Barrow | A01K 91/08 43/42.22 |
| 7,520,088 B2 * | 4/2009 | Even | A01K 91/08 43/43.13 |
| 7,578,092 B2 * | 8/2009 | Spickelmire | A01K 91/08 43/43.13 |
| 7,644,534 B2 | 1/2010 | Hagen et al. | |
| 7,971,386 B2 * | 7/2011 | Garrett | A01K 91/08 43/43.13 |
| 8,176,672 B1 * | 5/2012 | Schmeisser | A01K 97/01 43/17 |
| 8,695,271 B1 | 4/2014 | Ehlers et al. | |
| 9,648,859 B2 * | 5/2017 | Neimann | A01K 91/08 |
| 10,524,460 B1 * | 1/2020 | Konitzer | G08B 21/18 |
| 10,617,105 B2 * | 4/2020 | Wakefield | A01K 91/08 |
| 10,626,901 B2 * | 4/2020 | Norris | A01K 73/10 |
| 2006/0207162 A1 * | 9/2006 | Pieczynski | A01K 91/08 43/43.13 |
| 2007/0173139 A1 | 7/2007 | Gierke | |
| 2007/0193107 A1 * | 8/2007 | Garrett | A01K 91/08 43/43.13 |
| 2008/0307692 A1 * | 12/2008 | Hagen | A01K 91/08 43/43.13 |
| 2011/0258901 A1 | 10/2011 | Garrett | |
| 2014/0085869 A1 * | 3/2014 | Quittner | F21L 4/005 362/103 |
| 2017/0150707 A1 | 6/2017 | Wakefield | |
| 2017/0251652 A1 | 9/2017 | Novak | |
| 2019/0053479 A1 * | 2/2019 | Vergara | B63B 1/248 |
| 2020/0187479 A1 * | 6/2020 | Chapel | A01K 97/12 |

* cited by examiner

PLANER BOARD

CROSS-REFERENCE TO RELATED APPLICATIONS

The present application claims the benefit of U.S. provisional patent application Ser. No. 62/781,005, titled "Planer Board," filed Dec. 18, 2018, which is incorporated by reference herein in its entirety.

BACKGROUND

Planer boards are devices used in fishing that allow multiple fishing lines to be trolled from a boat. Generally, planer boards consist of a block having a wedge-like leading end with the devices being attached in various ways to a fishing line. When connected to a fishing line, the planer board floats near the surface of the water and trolls generally parallel to the direction that the boat is travelling. The block acts as a type of rudder—as the fishing line pulls the block forward, the water acts against the wedge-like leading end to force the block and fishing line away from the line of travel of the boat. Accordingly, to prevent tangling when multiple fishing lines are trolled from a boat, a planer board may be attached to each line.

Planer boards typically attach to a fishing line at two positions. The first position usually includes a clamp or other gripping device that securely clamps onto the line and prevents it from slipping from the board. The second position is typically located at the trailing end of the planer board, where a "guidance device" is installed. The guidance device simply guides the fishing line such that it trails the planer board without extending too far to either side thereof; the guidance device does not typically grip or otherwise clamp onto the fishing line.

There is a need in the art for a planer board that is configured to allow a user to conveniently and securely attach and remove a fishing line to/from both the gripping device and the guidance device of the board. It would be beneficial if such planer board was further configured to allow the user to quickly remove the fishing line from only the gripping device—ideally with one hand—as the user reels the line into the boat (e.g., upon hooking a fish).

SUMMARY

In accordance with the foregoing objectives and others, exemplary planer boards are described herein. An exemplary planer board may include a body having a tapered leading end, a guiding assembly located at a trailing end of the body, and a gripping assembly extending away from a front surface of the body. The planer board may be securely attached to a fishing line via the guiding assembly and the gripping assembly in order to bias the line to one side when the planer board is moved through water (e.g., when trolling from a boat or fishing in a flowing body of water). And the planer board may include two actuators to allow a user to quickly and easily attach/remove the board to/from a fishing line: a single-release actuator that opens only the gripping assembly; and a dual-release actuator that simultaneously releases both the guiding assembly and the gripping assembly.

In one aspect of the embodiments, a planer board is provided. The planer board may include a substantially rectangular body defining an inner cavity. The body may include a tapered leading end, a trailing end, a top edge, a bottom edge, and a front side connected to an open rear side via the tapered leading end, the trailing end, the top edge and the bottom edge. The body may further include a channel extending through the front side, an aperture extending through at least one of the top edge and the bottom edge, and/or a slot extending through the trailing end.

In some embodiments, the planer board includes a guiding assembly having, for example, a pivot arm disposed within the inner cavity, wherein the pivot arm includes a leading end and a trailing end attached to a pin. The guiding assembly may further include a dual-release actuator having: a first portion seated within the inner cavity of the body, the first portion in communication with the leading end of the pivot arm and including an opening; and a second portion extending through the aperture in the at least one of the top edge and the bottom edge. Generally, the guiding assembly is adapted to releasably contain a fishing line disposed within the slot extending through the trailing end of the body via the pin.

The planer board may also include a gripping assembly. In one embodiment, the gripping assembly includes an outer housing extending from a first end connected to the front surface of the body to a second end that includes a gripping member. The gripping assembly may also include a gripping lever at least partially disposed within the outer housing. Such gripping lever may extend from a single-release actuator located at a first end within the inner cavity of the body, through the opening of the dual-release actuator, through the channel in the front side of the body, and to a second end that includes a gripping plate. Generally, the gripping assembly may be adapted to releasably grip the fishing line between the gripping member of the outer housing and the gripping plate of the gripping lever. It will be appreciated that the single-release actuator of the gripping assembly may be configured to actuate only the gripping assembly, and the dual-release actuator of the guiding assembly may be configured to actuate both the gripping assembly and the guiding assembly.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-5D show an exemplary gripping assembly 165 according to an embodiment. FIGS. 5A-5C show the gripping assembly 165 in a closed configuration and FIG. 5D shows the gripping assembly in an open configuration.

FIGS. 8A-8D show an alternative embodiment of a gripping assembly 265.

FIGS. 9A-9C show an exemplary planer board 300 comprising a flag member 385 and flag actuator 390.

DETAILED DESCRIPTION

Various planer boards embodiments are disclosed herein. The planer boards may comprise a body having a rectangular portion and a tapered leading end, a guiding assembly located at a trailing end of the body, and a gripping assembly extending away from a front surface of the body. Generally, the planer boards may be securely attached to a fishing line via the guiding assembly and the gripping assembly in order to bias the line to one side when the planer board is moved through water (e.g., when trolling from a boat or fishing in a flowing body of water).

In one embodiment, the planer board includes two actuators to allow a user quickly and easily attach/remove the board to/from a fishing line: a single-release actuator that opens only the gripping assembly; and a dual-release actuator that simultaneously releases both the guiding assembly and the gripping assembly. In certain embodiments, the planer board may be "reversible" such that a user may configure the board to include a gripping assembly on a top side of the board or on a bottom side thereof, as desired or required. It will be appreciated that, in either configuration, both the single-release actuator and dual-release actuator will function in substantially the same manner.

Referring to FIGS. 1-4, various views of an exemplary planer board 100 according to an embodiment are illustrated. As shown, the planer board 100 may comprise a body 110, a guiding assembly 120, a gripping assembly 165, a single-release actuator 180, a dual-release actuator 130, a buoyancy member 140, a retaining mechanism 155 and/or one or more removable weights 150.

Body

In one embodiment, the planer board 100 comprises a body or housing 110 defining an inner cavity 114 in which various components may be seated. The body 110 may comprise a substantially flat, generally rectangular front wall 113 connected to an open back/rear surface via a leading end 111, a trailing end 112, a top wall 115 and a bottom wall 116. The trailing end 112, top wall 115 and bottom wall 116 may each be substantially flat and substantially perpendicular to the front wall 113.

As shown, the leading end 111 of the body 110 may be tapered such that it extends at angle from the front wall 113 towards the open back surface. The leading end (also referred to herein as a "ramp") 111 thus acts to bias the body 110 to one side as the planer board 100 travels through water. It will be appreciated that the angle of the ramp 111 may be varied to achieve a desired or required performance or stability characteristic.

In certain embodiments, the front wall 113 of the planer board body 110 may comprise one or more channels, such as a top channel 101 and a bottom channel 102. As discussed in detail below, the channel(s) 101, 102 may be configured to allow a single-release actuator 181 of a gripping lever 180 to extend through the front wall 113 and into the inner cavity 114 of the body 110. It will be appreciated that two channels 101, 102 may be provided to allow the planer board to be reversible (i.e., to have the gripping member 165 inserted into the top channel 101 or the bottom channel 102 as desired).

Similarly, in certain embodiments, the top 115 and/or bottom 116 walls may each comprise an aperture 117, 118. As discussed below, such aperture(s) 117, 118 may be configured to allow a tab 131 of the dual-release actuator 130 to extend from within the inner cavity 114 and through the respective wall 115, 116. Again, it will be appreciated that two apertures 117, 118 may be provided to allow the planer board to be reversible.

The body 110 may further comprise a narrow slot 109 extending through the trailing end 112 and the front wall 113 thereof. The slot 109 may extend a distance along the front wall 113, from the trailing end 112 toward the leading end 111; and the slot 109 may also extend a distance along the trailing end 112, between the top 115 and bottom walls 116. In certain embodiments, the slot 109 may be located about midway between the top 115 and bottom 116 walls to produce a desired behavior.

Figure 1:
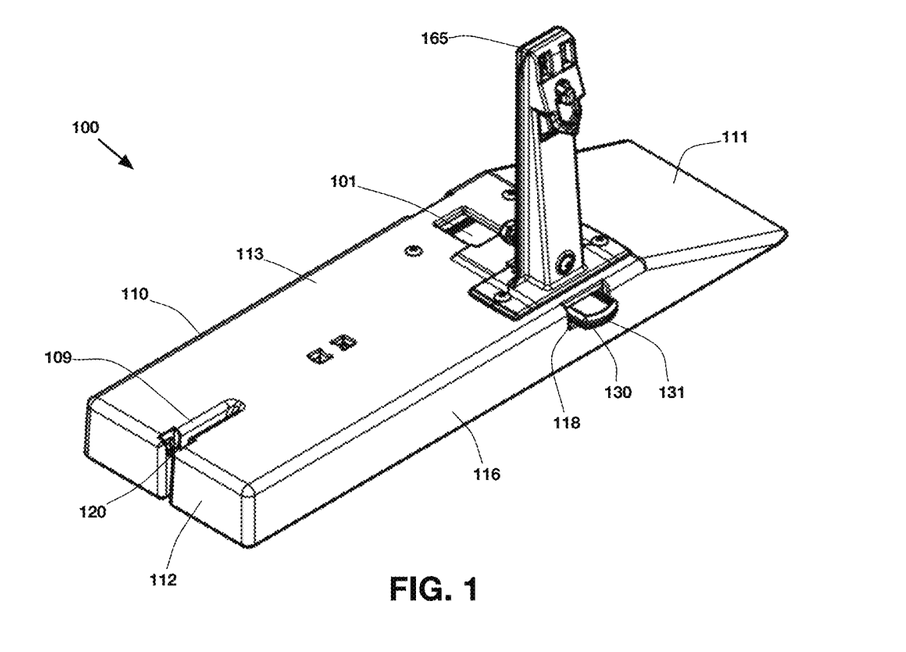
FIGS. 1-3 show various views of an exemplary planer board 100 according to an embodiment.
Figure 2:
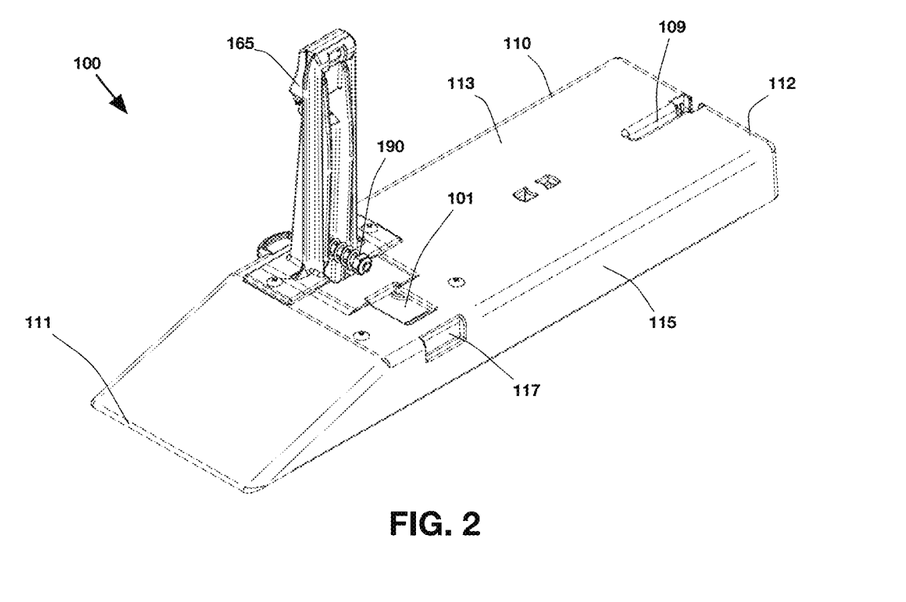
Figure 3:
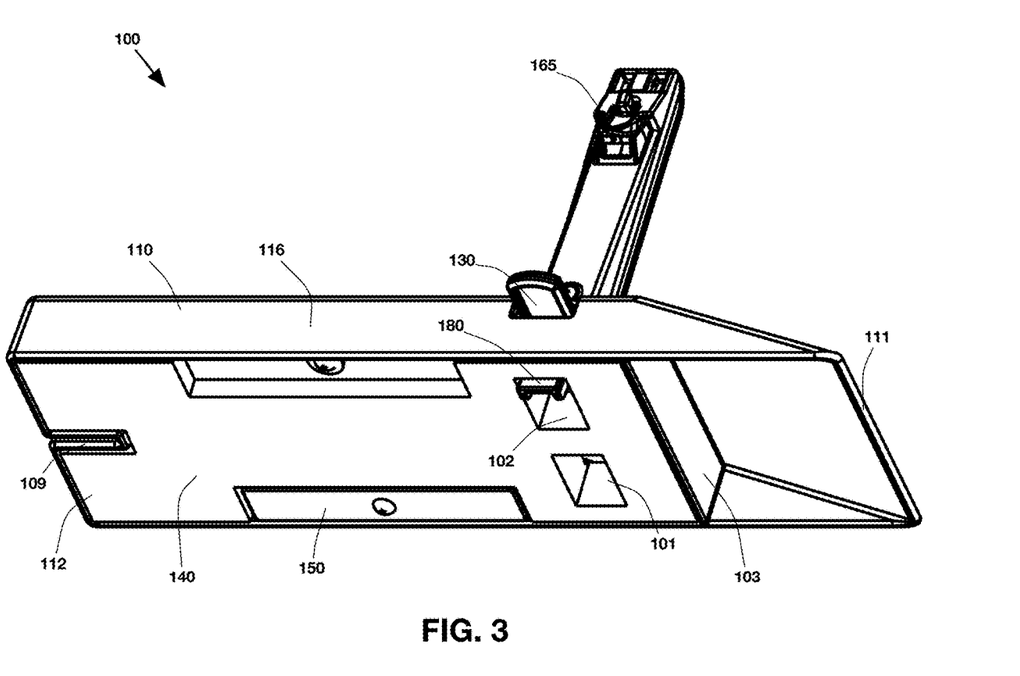
Figure 4:
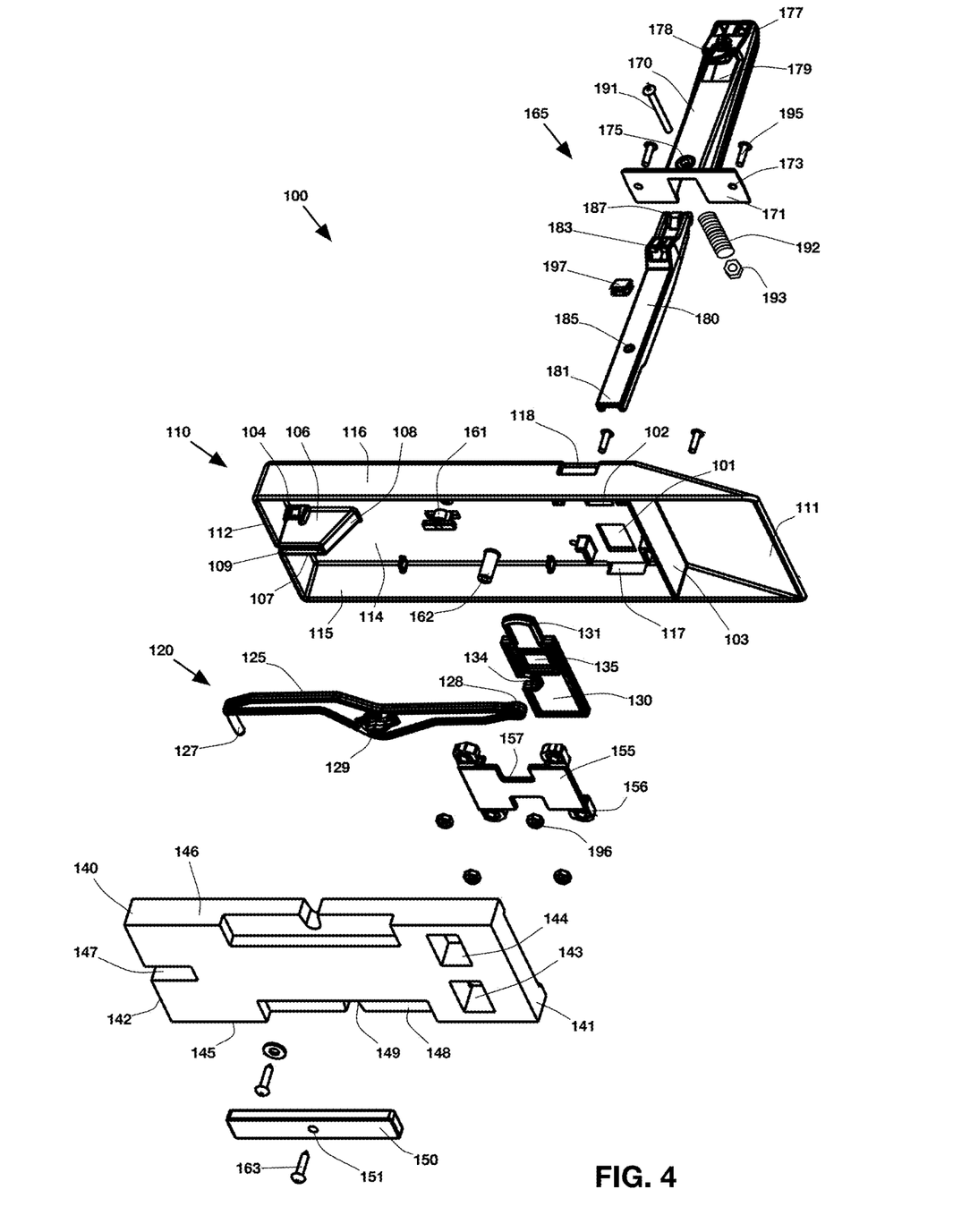
FIG. 4 shows an exploded view of the exemplary planer board 100, wherein the board comprises a body 110, a guiding assembly 120, a gripping assembly 165, a retaining mechanism 155, a buoyancy member 140 and a removable weight 150.

As shown in FIG. 4, the slot 109 may be defined by parallel top 107 and bottom 106 slot walls that are connected by a leading slot wall 108. Each of the slot walls (106-108) may extend a distance from the front wall 113 of the body 110 into the inner cavity 114 thereof. And the top 107 and bottom 106 slot walls may extend from the trailing end 112 toward the leading end 111.

Figure 6A:
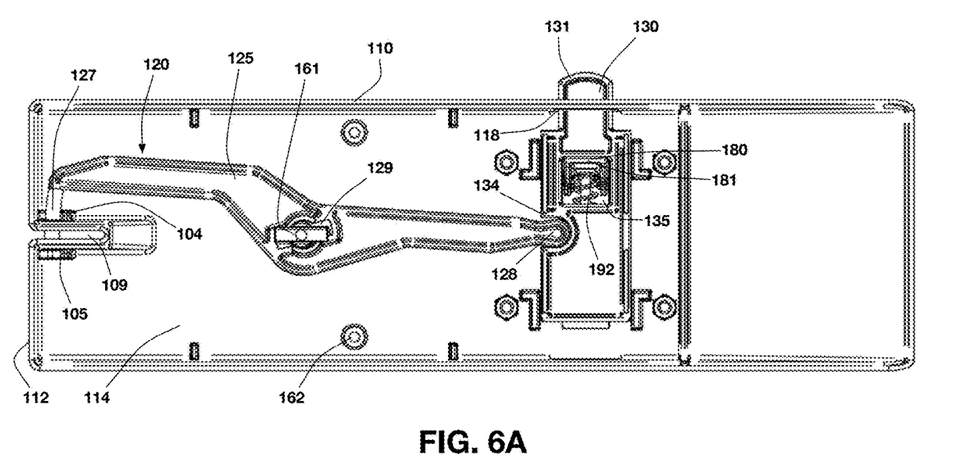
FIGS. 6A-6B show an exemplary planer board body 110 having a buoyancy member and weight removed and comprising a dual-release actuator 130 and a single-release actuator 180 in a first and second position, respectively.
Figure 6B:
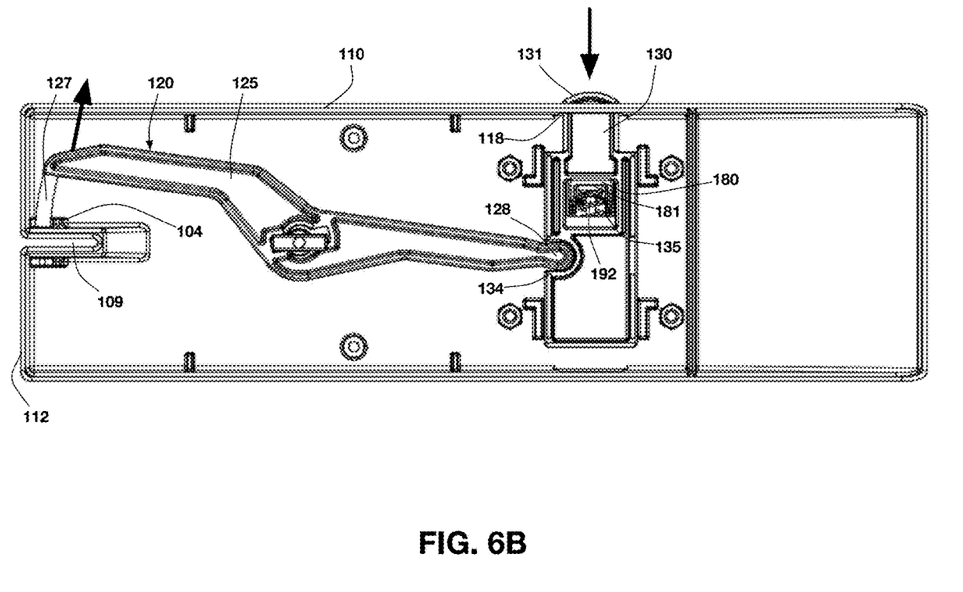

As shown in FIGS. 6A-6B, the top slot wall 107 and bottom slot wall 106 may each comprise an aperture 104, 105 extending therethrough. As discussed in detail below, such apertures 104, 105 may be located proximate to the trailing end 112 and may be sized to removably secure a pin 127 of the guiding assembly 120 therein when the guiding assembly is in a closed configuration.

In one embodiment the body 110 is made of a polycarbonate material such as high-impact copolymer polypropylene. In other embodiments the body 110 may be made of other plastic, metal, and/or wood materials.

Gripping Assembly

Referring to FIGS. 4 and 5A-5D, an exemplary gripping assembly 165 is illustrated. Generally, the planer board 100 may comprise a gripping assembly 165 extending from the front wall 113 of the body 110 for releasably gripping a fishing line and allowing for manual release of the line when desired. The gripping assembly 165 is shown in a closed position in FIGS. 5A-5C and in an open position in FIG. 5D.

As shown, the gripping assembly 165 comprises an outer housing 170 connected to an inner gripping lever 180 via a tightening mechanism 190. In one embodiment, the outer housing 170 extends from a distal end 177 comprising a gripping member 178 to a base 171 at its proximal end. Generally, the housing 170 defines an inner cavity 174 adapted to receive a portion of the gripping lever 180 therewithin. The outer housing 170 may include a number of openings through which portions of the gripping lever 180 may extend. For example, the illustrated housing 180 comprises an opening 172 located along its base 171, an open side surface 176, and an opening 179 proximate to its distal end 177.

The gripping lever 180 generally comprises a rod-like structure having a proximal end defining the single-release actuator 181 and a gripping plate 183 located at its distal end. As shown, a portion of the gripping lever 180 extends coaxially within the inner cavity 174 of the outer housing 170, while the single-release actuator 181 extends out through the opening 172 in the base 171 of the outer housing and the gripping plate 183 extends out through the opening 179 proximate the distal end 177 of the housing. In certain configurations, a side of the gripping lever 180 may also extend out of the inner cavity 174 of the outer housing 170 via the open side surface 176 thereof.

In certain embodiments, the outer housing 170 may be secured to the inner gripping lever 180 via a tightening mechanism 190 that comprises a bolt 191, a spring 192 and a nut 193. For example, both the outer housing 170 and gripping lever 180 may comprise apertures (see FIG. 4 at 175, 185) located close to their proximal ends. Such apertures 175, 185 may be configured to receive the bolt 191 of the tightening mechanism 190 therein, while preventing passage of the spring 192 therethrough. Accordingly, once the bolt 191 is inserted through the apertures 175, 185, the spring 192 may be secured about the bolt with the nut 193.

Figure 5A:
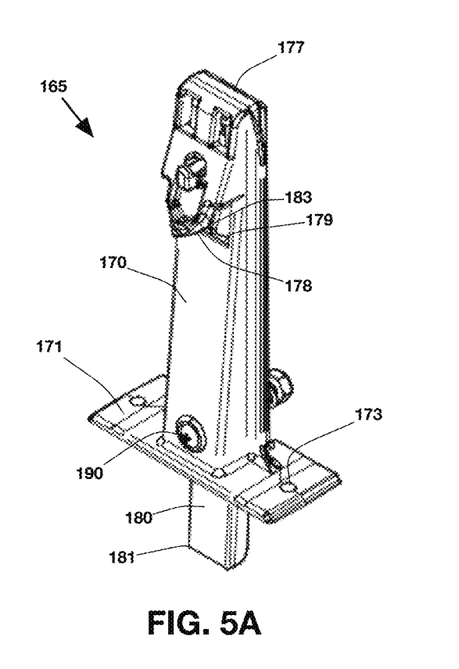
Figure 5B:
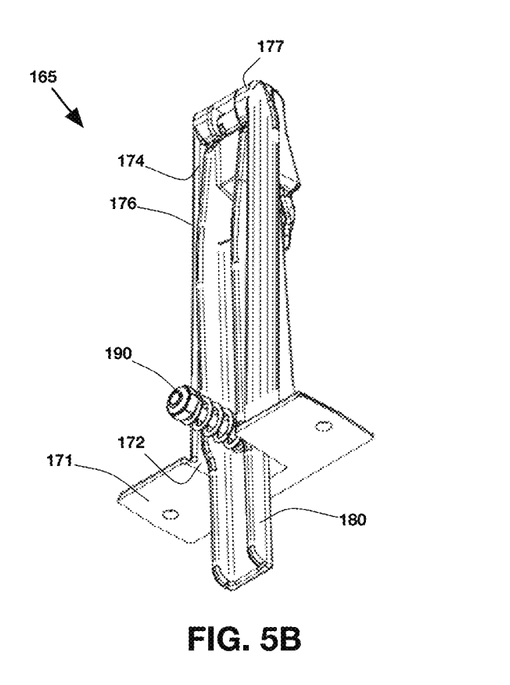
Figure 5C:
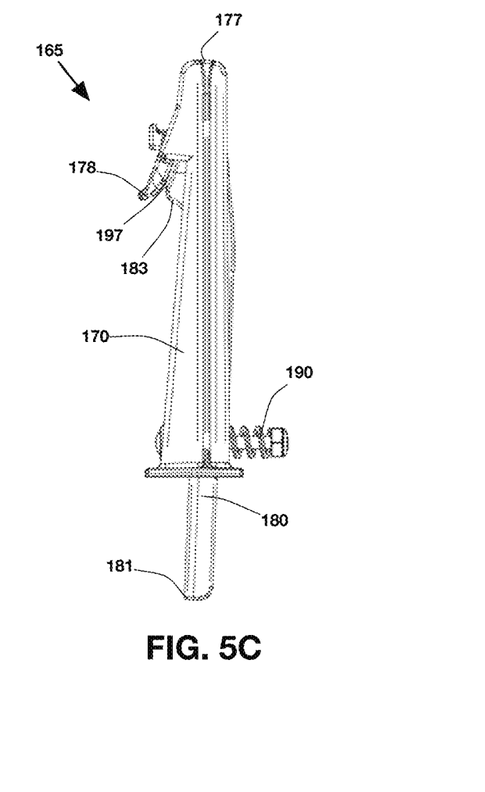

As shown, the tightening mechanism 190 causes the gripping plate 183 of the gripping lever 180 to remain in contact with the gripping member 178 of the outer housing 170. Accordingly, the tightening mechanism 190 causes the gripping assembly 165 to remain in a closed position due to the force exerted by the spring 192.

Figure 5D:
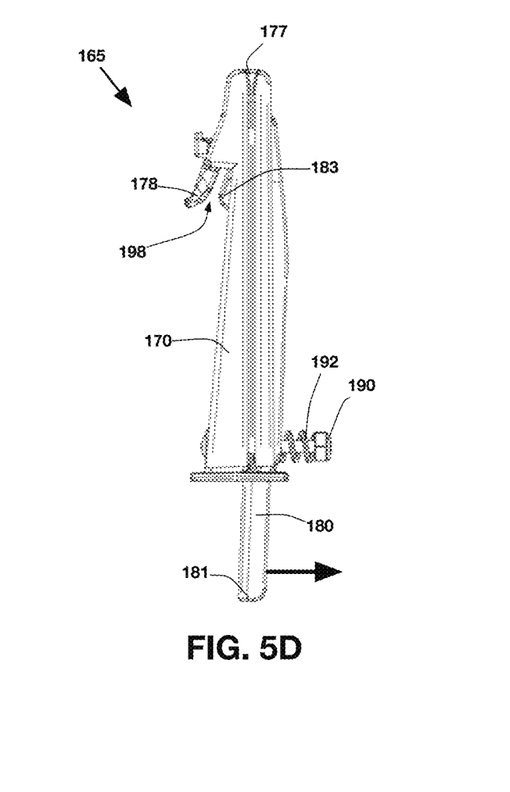

As shown in FIG. 5D, in order to open the gripping assembly 165, a user may push or pull the single-release actuator 181 of the gripping lever 180 against the bias of a spring 192 (i.e., towards the open side surface 176 of the housing 170). This causes the gripping plate 183 of the gripping lever 180 to move away from the gripping member 178 of the outer housing 170 as the distal end 177 of the housing and the distal end (FIG. 4 at 187) of the lever remain in contact. That is, a space 198 forms between the gripping plate 183 and the gripping member 178, which allows a fishing line to be inserted into and/or removed from the gripping assembly 165.

In certain embodiments, a rubber grip piece 197 may be attached to the gripping plate 183 and/or the gripping member 178. For example, a rubber grip piece 197 may be adhered or otherwise connected to gripping plate 183 to provide additional friction when a fishing line is present. In other embodiments, the gripping plate 183 and/or the gripping member 178 may be coated with rubber or other materials to increase friction.

It will be appreciated that the tightening mechanism 190 may be set to a desired strength by, for example, tightening or loosening the nut 193. For example, when fishing for strong fish, the tightening mechanism 190 may be set somewhat more loosely than normal so that a fishing line secured to the gripping assembly 165 may pull free and not add to the drag exerted by the fish.

The gripping assembly 165 may be secured to a planer board body via any suitable means. For example, as discussed in detail below, the base 171 of the outer housing 170 may include one or more screw holes 173 such that it may be fastened to the front face 113 of the planer board body 110 with one or more screws (e.g., screw 195).

Guiding Assembly

Referring to FIGS. 4 and 6A-6B, details of an exemplary guiding assembly 120 are illustrated. FIGS. 6A-6B show an exemplary planer board body 110 having a buoyancy member and weight removed and comprising a dual-release actuator 130 and a single-release actuator 181. The guiding assembly 120 is illustrated in a closed position in FIG. 6A and in an open position in FIG. 6B.

Generally, the trailing end 112 of the planer board body 110 may comprise a guiding assembly 120 for releasably holding a fishing line and allowing for manual release of the line when desired. As shown, the guiding assembly 120 comprises a dual-release actuator 130, a pivot arm 125, and a pin 127 attached to the pivot arm.

In one embodiment, the dual-release actuator 130 comprises a thin, substantially rectangular member having a tab 131 extending from a bottom side thereof. The tab 131 of the dual-release actuator 130 is adapted to extend through the top wall aperture 117 and/or bottom wall aperture 118 of the planer board body 110. Accordingly, the tab 131 may align with the aperture 117, 118 when the dual-release actuator 130 is seated within the inner cavity 114 of the body 110. Importantly, the rectangular member of the dual-release actuator 130 is larger than the aperture 117, 118 and, therefore, remains seated within the inner cavity 114 of the body 110; only the tab 131 extends out from the body.

The dual-release actuator 130 further comprises a square-shaped aperture 135 proximate to its bottom side. Generally, the aperture 135 of the dual-release actuator 130 is adapted to receive the single-release actuator 181 of the gripping lever 180 therein. Accordingly, the aperture 135 may align with the top 101 or bottom channel 102 of the planer board body 110 when the dual-release actuator 130 is seated within the inner cavity 114 of the body.

The dual-release actuator 130 may further comprise a groove 134 located on a back side of the actuator, proximate to a top side thereof. As explained below, the groove 134 is adapted to receive a leading end 128 of a pivot arm 125 therein, such that the pivot arm may be rotated as the dual-release actuator moves from a top position to a bottom position and vice versa. Accordingly, the groove 134 comprise a shape/size (e.g., a concave curve) that corresponds to a size shape of the leading end 128 of the pivot arm 125 (e.g. a convex curve).

The pivot arm 125 of the guiding assembly 120 comprises a leading end 128 in communication with the groove 134 of the dual-release actuator 130, an aperture 129, and a trailing end comprising a pin 127. Generally, the pivot arm 125 may be attached to the inner surface of the planer board body 110, within the inner cavity 114, via a fastening mechanism 161 that is inserted into the aperture 129 and tightened to the body as desired (e.g., a screw or the like). The pivot arm 125 is sized/shaped such that, once it is attached to the body 110 via the fastening mechanism 161, the pin 127 at the pivot arm's trailing end is aligned with the apertures 104, 105 in the slot 109.

As shown in FIG. 6A, the pivot arm 125 is configured such that the pin 127 extends into the slot wall apertures 104, 105 when the dual-release actuator is at rest (e.g., when the tab 131 of the actuator is not being pushed into the bottom wall aperture 118). In this closed configuration, the pin 127 extends through slot wall aperture 104 and partially into slot wall aperture 105 to effectively close the slot 109. Accordingly, when a fishing line is present within the slot 109, the pin 127 of the guiding assembly 120 prevents the fishing line from exiting through the trailing end 112 of the planer board body 110 (see, e.g., FIG. 9A).

As discussed above, the spring 191 of the tightening mechanism 190 causes the single-release actuator 181 of the gripping lever 180 to remain in a first position (i.e., a closed position). It will be appreciated that, because the single-release actuator 181 extends through, and contacts, the aperture 135 of the dual-release actuator 130, the single-release actuator 181 exerts a force on the dual-release actuator 130, which causes the dual-release actuator 130 to remain in a first, closed position. This, in-turn, causes the pivot arm 125 and pin 127 to remain in a first, closed position (i.e., with the pin extending through the apertures 104, 105 of the slot 109), because the leading end 128 of the pivot arm is in communication with the dual-release actuator 130 via the groove 134 thereof.

As shown in FIG. 6B, in order to open the guiding assembly 120, a user may push the tab 131 of the dual-release actuator 130 into the inner cavity 114 of the body 110 (i.e., against the bias of single-release actuator 181). This causes the dual-release actuator 130 to slide in the direction of the applied force, as the groove 134 of the actuator remains in contact with the leading end 128 of the pivot arm 125. This, in-turn, causes the pivot arm 125 arm and pin 127 to rotate with respect to the slot 109 to a second, open position, wherein the pin 127 does not extend into the slot wall apertures 104, 105. Accordingly, a fishing line may be inserted into and/or removed from the open guiding assembly 120 via the trailing end 112 of the slot (see, e.g., FIG. 9B).

Figure 7:
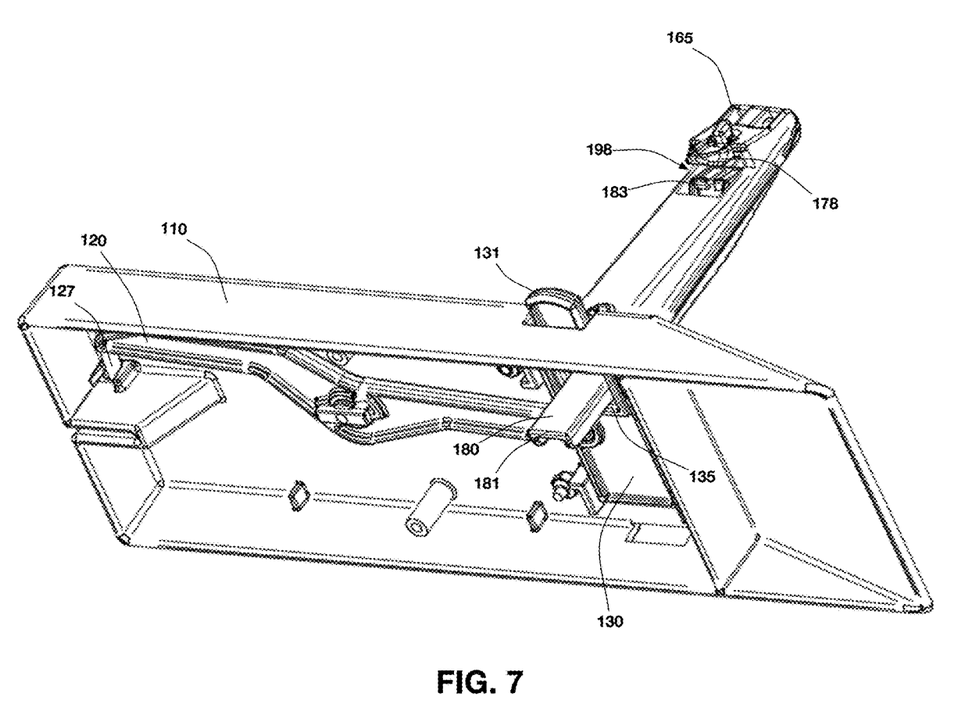
FIG. 7 shows the exemplary planer board body 110 wherein the dual-release actuator 130 is moved into a second position causing a gripping assembly 165 and guiding assembly 120 to open.

Referring to FIG. 7, the exemplary planer board body 110 is illustrated wherein the tab 131 of the dual-release actuator 130 is moved into the open position (i.e., pushed into the inner cavity of the body 110). In addition to opening the guiding assembly 120, as discussed above, this also causes the gripping assembly 165 to move into an open position, wherein a space 198 forms between the gripping plate 183 and the gripping member 178. Because the single-release actuator 181 of the gripping lever 180 extends through, and contacts, the aperture 135 of the dual-release actuator 130, the dual-release actuator 130 exerts a force on the single-release actuator 181. Accordingly, the dual-release actuator 130 actuates the single-release actuator 181, when the tab 131 of the dual-release actuator 130 is pushed into the body 100, to thereby cause the gripping assembly to open.

As explained above, the spring 191 of the tightening mechanism 190 causes the single-release actuator 181 of the 180 gripping lever to return to a closed state when neither the single-release actuator 181 nor the dual-release actuator 130 are being actuated. Accordingly, once the force is removed from the tab 131 of the dual-release actuator 130, both the gripping assembly 165 and the guiding assembly 120 will return to a closed state.

Importantly, the single-release actuator 181 may be actuated without actuating the dual-release actuator 130. That is, the gripping assembly 165 may be opened without opening the guiding assembly 120. As shown, the single-release actuator 181 may be moved within the aperture 135 of the dual release actuator 130 without applying a substantial force on the dual-release actuator. Accordingly, a user may open only the gripping assembly 165 by actuating the single-release actuator 181, without opening the guiding assembly 120 (i.e., without actuating the dual-release actuator 130).

In operation, the planer board 100 may be attached to a fishing line by pushing the tab 131 of the dual-release actuator 130 into the inner cavity 114 of the body 110, thereby opening both the guiding assembly 120 and the gripping assembly 165, as discussed above. The fishing line may then be easily inserted (e.g., with a free hand of the user) into the slot 109 and into the space 198 between the gripping plate 178 and the gripping member 183 of the gripping assembly 165, near the distal end of the assembly. Releasing the tab 131 of the dual-release actuator 130 causes both the guiding assembly 120 and the gripping assembly 165 to return to a closed position.

Moreover, a user may quickly detach the gripping assembly 165 from the fishing line, while leaving the guiding assembly 120 attached to the line (e.g., when reeling in a fish). This may be accomplished by actuating only the single-release actuator 181 (i.e., without actuating the dual-release actuator 130). It will be appreciated that, in this case, releasing the single-release actuator 181 causes the gripping assembly 165 to return to a closed position.

Retaining Mechanism

As shown in FIG. 4, the planer board 100 includes a retaining mechanism 155 that is adapted to secure the gripping assembly 165 to the planer board body 110. As shown, the retaining mechanism 155 includes a number of screw anchors 156, each of which is adapted to securely retain a screw. For example, the base 171 of the gripping assembly 165 may be secured to the front wall 113 of the planer board body 110 by inserting a screw (e.g., screw 195) into a hole in the base (e.g., hole 173), through a corresponding hole in the front wall (not shown), and into a corresponding screw anchor (e.g., anchor 156) of the retaining mechanism 155. In this way, both the retaining mechanism 155 and the gripping assembly 165 may be secured to the planer board body 110.

The retaining mechanism 155 may comprise a thin metal or plastic plate having one or more grooves 157. Such grooves may be employed as not to interfere with movement of the single-release actuator 181 of the gripping lever 180 when it is seated within the aperture 135 of the dual-release actuator 130. To that end, when the planer board 100 is fully assembled, the top groove 157 of the retaining mechanism 155 aligns with the top channel 101 of the front wall 113 of the body 110, and the bottom groove 157 aligns with the bottom channel 102.

When fully assembled, the retaining mechanism 155 may be positioned within the inner cavity 114 of the body 110, between a buoyancy member 140 and both the dual-release actuator 130 and pivot arm 125. This configuration further secures the dual-release actuator 130 and pivot arm 125 to the body 110 and prevents the buoyancy member 140 from interfering with operation of such components.

Buoyancy Member

As shown in FIG. 4, a buoyancy member 140 may be disposed within the inner cavity 114 of the planer board body 110 to keep the planer board 100 afloat in water. In certain embodiments, the buoyancy member 140 may comprise a foam material, such as STYROFOAM or polyethylene foam. In other embodiments, other buoyant materials may be employed.

Generally, the buoyancy member 140 may be sized/shaped such that it fits within the inner cavity 114 of the body 110. To that end, the buoyancy member 140 may comprise parallel front and rear walls that are similar in size/shape to the front wall 113 of the body. The front and rear walls may be connected via a leading end 141, a trailing end 142, a top wall 145 and a bottom wall 146, each of which may be similar in size/shape to the corresponding wall of the body 110. And the buoyancy member 140 may comprise a slot 147 proximate to its trailing end 142 and sized to allow the slot walls 106-108 of the planer board body to extend therewithin.

The buoyancy member 140 may comprise one or more channels, extending through the top 145 and bottom walls 146 thereof (e.g., top channel 143 and bottom channel 144). Each channel 143, 144 may be positioned to align with a corresponding channel (e.g., channel 101 and 102, respectively) in the front wall 113 of the planer board body 110. Accordingly, when the planer board 100 is fully assembled, the single-release actuator 181 may extend through a channel (e.g., channel 102) in the front wall 113 of body 110, through the aperture 135 of the dual-release actuator 130, through a channel (e.g., channel 144) in the buoyancy member 140, and out of the rear wall of the buoyancy member 140 (see, e.g., FIG. 3).

The buoyancy member 140 may be secured within the inner cavity 114 of the body 110 via any means. For example, the buoyancy member 140 may be adhered to one or more inner surfaces 103, 112, 113, 115, 116 of the body using a suitable adherent. As another example, the buoyancy member 140 may comprise one or more grooves 149, each of which may be adapted to have a fastener inserted therein (e.g., screw 163) and fastened to an anchor 162 located on the body 110.

Finally, as discussed below, the buoyancy member 140 may comprise one or more weight docks 148, each configured to receive a removable weight 150 therein. Such weight docks may be located anywhere along the rear wall of the buoyancy member 140, for example at a top edge and/or bottom edge thereof.

Weights

As shown in FIG. 4, the planer board 100 may include one or more weights 150 removably secured thereto. Such weights 150 generally act to change the center of gravity of the planer board 100, thereby varying the behavior of board during use in the water.

As shown, the removable weights 150 may be sized/shaped to fit within a weight dock 149 located on the back surface of the buoyancy member 150. In certain embodiments, the weight 150 may comprise a rectangular cross-section, with longer front and back surfaces connected by shorter top, bottom, leading and trailing surfaces.

A removable weight 150 may be fastened to the buoyancy member 140 via any suitable means. In one embodiment, the weight 150 comprises one or more apertures 151 that align with the one or more grooves 149 in the buoyancy member 140 when the weight is seated within the weight dock 148 of the buoyancy member. In such embodiment, a screw 163 may be inserted into the weight aperture 151, through the groove 149 of the buoyancy member 140, and the screw may be fastened to a screw anchor 162 located on an inner surface of the front wall 113 of the body 110 to thereby secure the weight 150 and buoyancy member 140 to the planer board body 110.

Alternative Gripping Assembly Embodiment

Figure 8A:
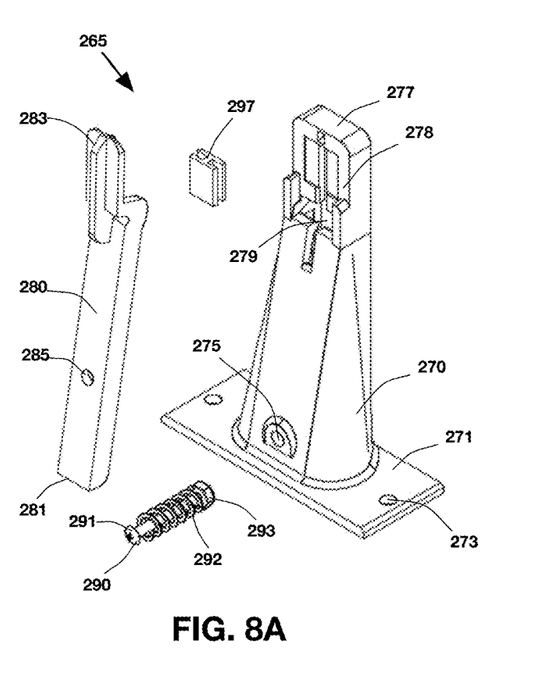
FIG. 8A shows an exploded view of the gripping assembly 265, where an outer housing 270, gripping lever 280, rubber gripping pad 297 and tightening mechanism 290 are visible.
Figure 8B:
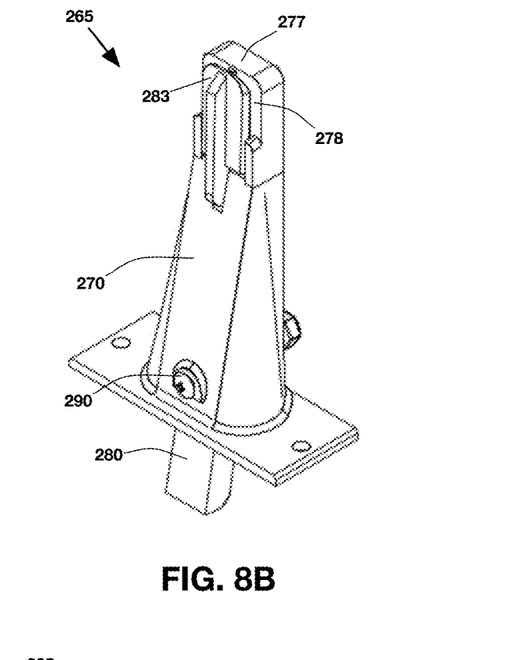
FIGS. 8B-8C show the gripping assembly 265 in a closed configuration and FIG. 8D shows the gripping assembly 265 in an open configuration.
Figure 8C:
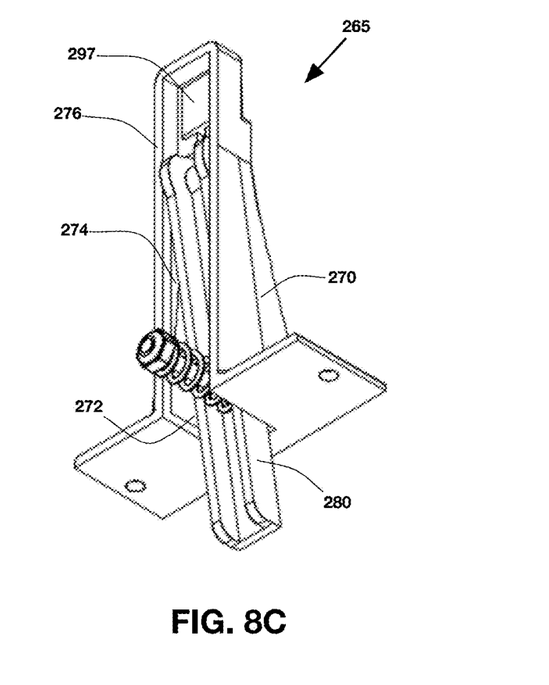
Figure 8D:
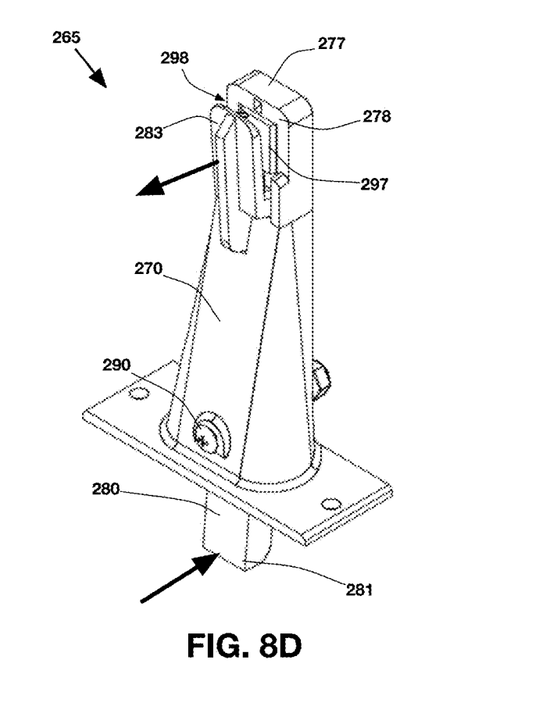

Referring to FIGS. 8A-8D, an alternative gripping assembly 265 embodiment is illustrated. FIG. 8A shows an exploded view of the gripping assembly 265. FIGS. 8B-8C show the gripping assembly 265 in a closed configuration; and FIG. 8D shows the gripping assembly in an open configuration.

As shown, the gripping assembly 265 comprises an outer housing 270 connected to an inner gripping lever 280 via a tightening mechanism 290. In the illustrated embodiment, the outer housing 270 extends from a distal end 277 comprising a gripping member 278 to a base 271 at a proximal end. Generally, the housing 270 defines an inner cavity 274 adapted to receive a portion of the gripping lever 280 therewithin. As shown, the outer housing 270 includes a number of openings through which portions of the gripping lever 280 extend. For example, the housing 270 comprises an opening 272 located along the base 271, an open side surface 276, and an opening 279 proximate to its distal end 277.

The gripping lever 280 generally comprises a rod-like structure having a proximal end defining the single-release actuator 281 and a gripping plate 283 located at its distal end. As shown, a portion of the gripping lever 280 extends coaxially within the inner cavity 274 of the outer housing 270, while the single-release actuator extends out through the opening 272 in the base 271 of the outer housing and the gripping plate 283 extends out through the opening 279 proximate the distal end 277 of the housing. In certain configurations, a side of the gripping lever 280 may also extend out of the inner cavity 274 of the outer housing 270 via the open side surface 276 thereof.

In one embodiment, the outer housing 270 may be attached to the inner gripping lever 280 via a tightening mechanism 290 that comprises a bolt 291, a spring 292 and a nut 293. For example, both the outer housing 270 and gripping lever 280 may comprise apertures (275, 285) located close to their proximal ends. Such apertures 275, 285 may be configured to receive the bolt 291 of the tightening mechanism 290 therein, while preventing passage of the spring 292 therethrough. Accordingly, once the bolt 291 is inserted through the apertures (275, 285), the spring 292 may be secured about the bolt with the nut 293.

As shown, the tightening mechanism 290 causes the gripping plate 283 of the gripping lever 280 to remain in contact with the gripping member 278 of the outer housing 270. That is, the tightening mechanism 290 causes the gripping assembly 265 to remain in a closed position due to the force exerted by the spring 292.

As shown in FIG. 8D, in order to open the gripping assembly 265, a user may push or pull the distal end 281 of the gripping lever 280 against the bias of spring 292 (i.e., towards the open side surface 276). This causes the gripping plate 283 of the gripping lever 280 to move away from the gripping member 278 of the outer housing 270. Accordingly, a space 298 forms between the gripping plate 283 and the gripping member 278, which allows a fishing line to be inserted and/or removed from the gripping assembly 265.

It will be appreciated that the embodiment shown in FIGS. 8A-8D differs from the embodiment shown in FIGS. 5A-5D because the distal end 277 of the outer housing 270 is not fixed to any portion of the gripping lever 280. Accordingly, in FIG. 8D, the gripping member 283 extends away from the open side 276 of the housing 270 when the single-release actuator 281 of the gripping lever 280 is moved toward the open side 276. In contrast, the gripping member 183 shown in FIGS. 5A-5D moves towards the open side 176 of the housing 170 when the single-release actuator of the gripping lever 180 is moved in the same direction. Still, both embodiments may be opened/closed in a substantially similar manner.

In certain embodiments, a separate, rubber grip 297 may be attached to the gripping plate 283 and/or the gripping member 278. For example, a rubber grip 297 may be adhered or otherwise connected to the gripping member 278 to provide additional friction when in contact with a fishing line.

The gripping assembly 265 shown in FIGS. 8A-8D may be secured to a planer board body via any suitable means. For example, the base 271 of the outer housing 270 may include one or more screw holes 273 such that it may be fastened to the planer board body with one or more screws, as described above with respect to the embodiment shown in FIGS. 5A-5D.

Figure 9A:
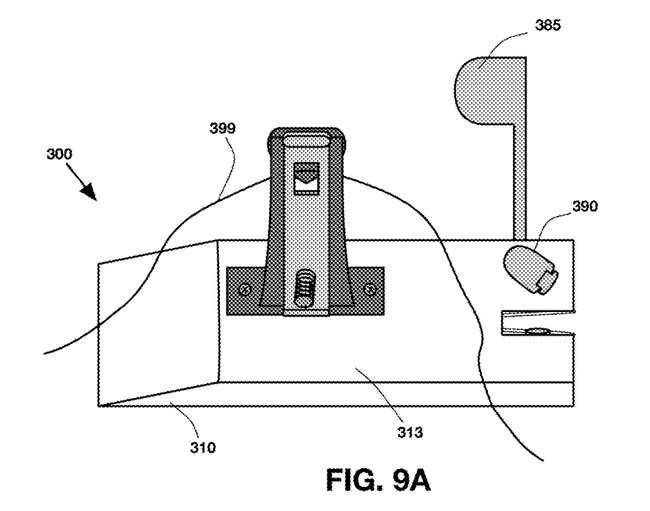
FIG. 9A shows the flag member 385 in a default, fully extended state.
Figure 9B:
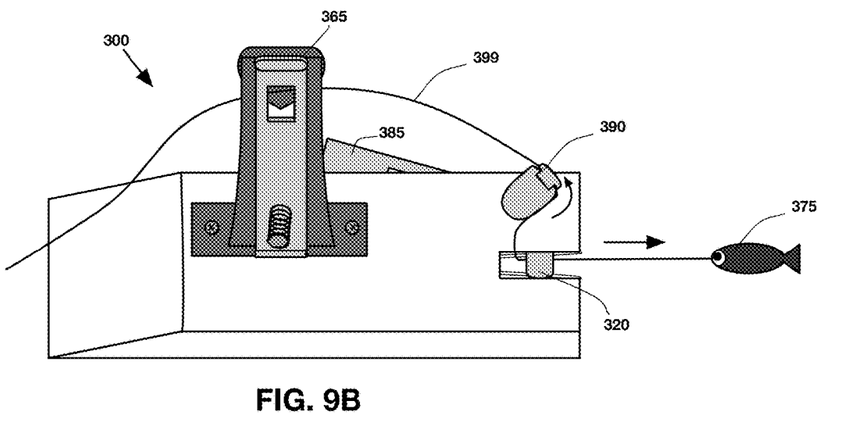
FIG. 9B shows the flag member in a retracted state.
Figure 9C:
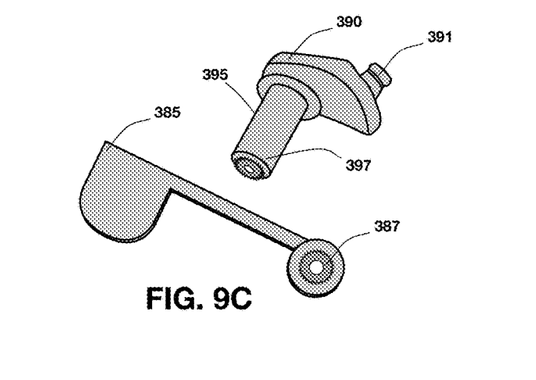
FIG. 9C shows a detailed view of the flag member 385 and flag actuator 390.

Referring to FIGS. 9A-9C, an exemplary planer board 300 comprising a flag member 385 and flag member actuator 390 is illustrated. FIG. 9A shows the flag member 385 in a default, fully extended state, FIG. 9B shows the flag member in a retracted state, and FIG. 9C shows a detailed view of the flag member and flag actuator 390. Generally, the flag member 385 may be employed to provide a visual signal indicating that a fish 397 is caught on a fishing line 399 that is secured to the planer board 300.

In one embodiment, a rotating flag member actuator 390 may be located on a front face 313 of the planer board body 310, between the gripping assembly 365 and the guiding assembly 320. As shown in FIG. 9C, the actuator 390 may comprise a gripping means 391, such as a protrusion, ledge, rim, groove, or the like, to allow for the fishing line 399 to be securely wrapped around the actuator during use. The actuator 390 may further comprise a cylindrical housing 395 having a spring or other biasing member contained therein (not shown). Generally, the cylindrical housing 395 may be sized/shaped to extend through an aperture (not shown) in the planer board body 110 such that a connector 397 located on a rear end of the aperture housing may be rotatably connected to a corresponding connector 387 of the flag member 385. Accordingly, when the actuator 390 and the flag member 385 are connected via the complementary connectors 397, 387, the flag member 385 will rotate between the extended state and retracted state as the actuator 390 rotates.

During use, a fishing line 399 may be secured to the gripping assembly 385, wrapped around the flag member actuator 390, and extended through the guiding assembly 320, in a trailing direction (i.e., away from the boat). As shown, when a fish 375 is caught on the line 399, the fish pulls the line away from the boat, which causes the actuator 390 to rotate the flag member 385 towards the retracted position (FIG. 9B). It will be appreciated that the actuator 390 may be biased towards the default position such that, in the event that the fish 375 stops pulling on the line 399, the actuator 385 will rotate back to its default position, which causes the flag member 390 to rotate back to the fully extended state (FIG. 9A).

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The subject described and claimed herein are illustrative and are not to be construed as limiting the scope of the embodiments. Moreover, the subject matter of this specification is not to be limited in scope by any specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A planer board comprising:
a substantially rectangular body defining an inner cavity, the body comprising:
a front side connected to an open rear side via a tapered leading end, a trailing end, a top edge and a bottom edge;
an aperture extending through the top edge or the bottom edge;
a channel extending through the front side; and
a slot extending through the trailing end;
a guiding assembly comprising:
a pivot arm disposed within the inner cavity of the body, the pivot arm comprising:
a leading end; and
a trailing end comprising a pin,
wherein the guiding assembly is configured such that:
the pin fully traverses the slot when the guiding assembly is in a closed position to prevent a fishing line disposed within the slot from exiting the slot; and
the pin does not fully traverse the slot when the guiding assembly is in an open position to allow the fishing line to enter and exit the slot;
a gripping assembly extending from the front side of the body, the gripping assembly comprising:
an outer housing extending from a first end connected to the front side of the body to a second end comprising a gripping member; and
a gripping lever at least partially disposed within the outer housing and comprising a gripping plate,
wherein the gripping assembly is configured to:
grip a fishing line when the gripping assembly is in a first position; and
release the fishing line when the gripping assembly is in a second position;
a single-release actuator in communication with the gripping assembly, the single-release actuator configured to actuate the gripping assembly from the first position to the second position; and
a dual-release actuator in communication with the gripping assembly via the single-release actuator and the guiding assembly, the dual-release actuator comprising:
a first portion seated within the inner cavity of the body, the first portion comprising an opening, and a groove in which the leading end of the pivot arm is disposed; and
a second portion extending through the aperture in the top or bottom edge,
wherein the dual-release actuator is configured to:
actuate the guiding assembly from the closed position to the open position; and actuate the gripping assembly from the first position to the second position wherein the gripping lever of the gripping assembly extends from the single-release actuator, through the opening of the dual-release actuator, through the channel in the front side of the body, and to the gripping plate.

2. A planer board according to claim 1, wherein the gripping assembly releasably grips the fishing line between the gripping member of the outer housing and the gripping plate of the gripping lever when the gripping assembly is in the first position.

3. A planer board according to claim 2, wherein the outer housing of the gripping assembly is connected to the gripping lever via a tightening mechanism that causes the gripping plate of the gripping lever to contact with the gripping member of the outer housing when the gripping assembly is in the first position.

4. A planer board according to claim 3, wherein the tightening mechanism comprises a bolt having a spring secured thereto.

5. A planer board according to claim 1, wherein the gripping assembly further comprises a rubber grip attached to the gripping plate of the gripping lever or the gripping member of the outer housing.

6. A planer board according to claim 1, wherein:
the body further compromises top and bottom slot walls extending into the inner cavity from the front side;
each of the top and bottom slot walls comprises a slot aperture; and
the pin of the guiding assembly is configured to extend into the slot wall apertures when the guiding assembly is in the closed position.

7. A planer board according to claim 1, further comprising: a buoyancy member disposed within the inner cavity of the body.

8. A planer board according to claim 1, further comprising: a retaining mechanism disposed within the inner cavity of the body, the retaining mechanism configured to secure the gripping assembly to the body.

9. A planer board according to claim 1, further comprising a flag member adapted to rotate between an extended position and a retracted position.

10. A planer board according to claim 9, further comprising a rotating flag member actuator attached to the front side of the body, the flag member actuator in communication with the flag member and configured to rotate the flag member between the extended position and the retracted position.

11. A planer board according to claim 1, wherein the body comprises high-impact copolymer polypropylene.

12. A planer board comprising:
a substantially rectangular body defining an inner cavity, the body comprising:
a front side connected to an open rear side via a tapered leading end, a trailing end, a top edge and a bottom edge;
a channel extending through the front side;
an aperture extending through the top edge or the bottom edge; and
a slot extending through the trailing end;
a guiding assembly comprising:
a pivot arm disposed within the inner cavity, the pivot arm comprising:
a leading end; and
a trailing end comprising a pin,
wherein the guiding assembly is adapted to releasably contain a fishing line disposed within the slot via the pin;
a gripping assembly comprising:
an outer housing extending from the front side of the body to a gripping member; and
a gripping lever at least partially disposed within the outer housing, the gripping lever comprising a gripping plate;
a dual-release actuator comprising:
a first portion seated within the inner cavity of the body and in communication with the leading end of the pivot arm, the first portion comprising an opening; and
a second portion extending through the aperture in the top or bottom edge of the body; and
a single-release actuator in communication with the gripping lever, the single-release actuator extending from the gripping lever and through the opening of the dual-release actuator;
wherein the single-release actuator is configured to actuate only the guiding assembly, and
wherein the dual-release actuator is configured to actuate both the gripping assembly and the guiding assembly.

13. A planer board according to claim 12, wherein:
the body further compromises top and bottom slot walls extending into the inner cavity from the front side;
each of the top and bottom slot walls comprises a slot aperture; and
the pin of the guiding assembly is configured to extend into the slot wall apertures when the guiding assembly is in the closed position.

14. A planer board according to claim 12, wherein the gripping assembly releasably grips the fishing line between the gripping member of the outer housing and the gripping plate of the gripping lever when the gripping assembly is in a closed position.

15. A planer board according to claim 14, wherein the outer housing of the gripping assembly is connected to the gripping lever via a tightening mechanism that causes the gripping plate of the gripping lever to contact the gripping member of the outer housing when the gripping assembly is in the closed position.

16. A planer board according to claim 12, further comprising:
a flag member adapted to rotate between an extended position and a retracted position; and
a rotating flag member actuator attached to the front side of the body and in communication with the flag member,
wherein the flag member actuator is configured to rotate the flag member between the extended position and the retracted position.

* * * * *